Sept. 10, 1946.   J. W. HEINEY   2,407,236
RUBBER SPRING MOUNTING
Filed March 16, 1944   3 Sheets-Sheet 1
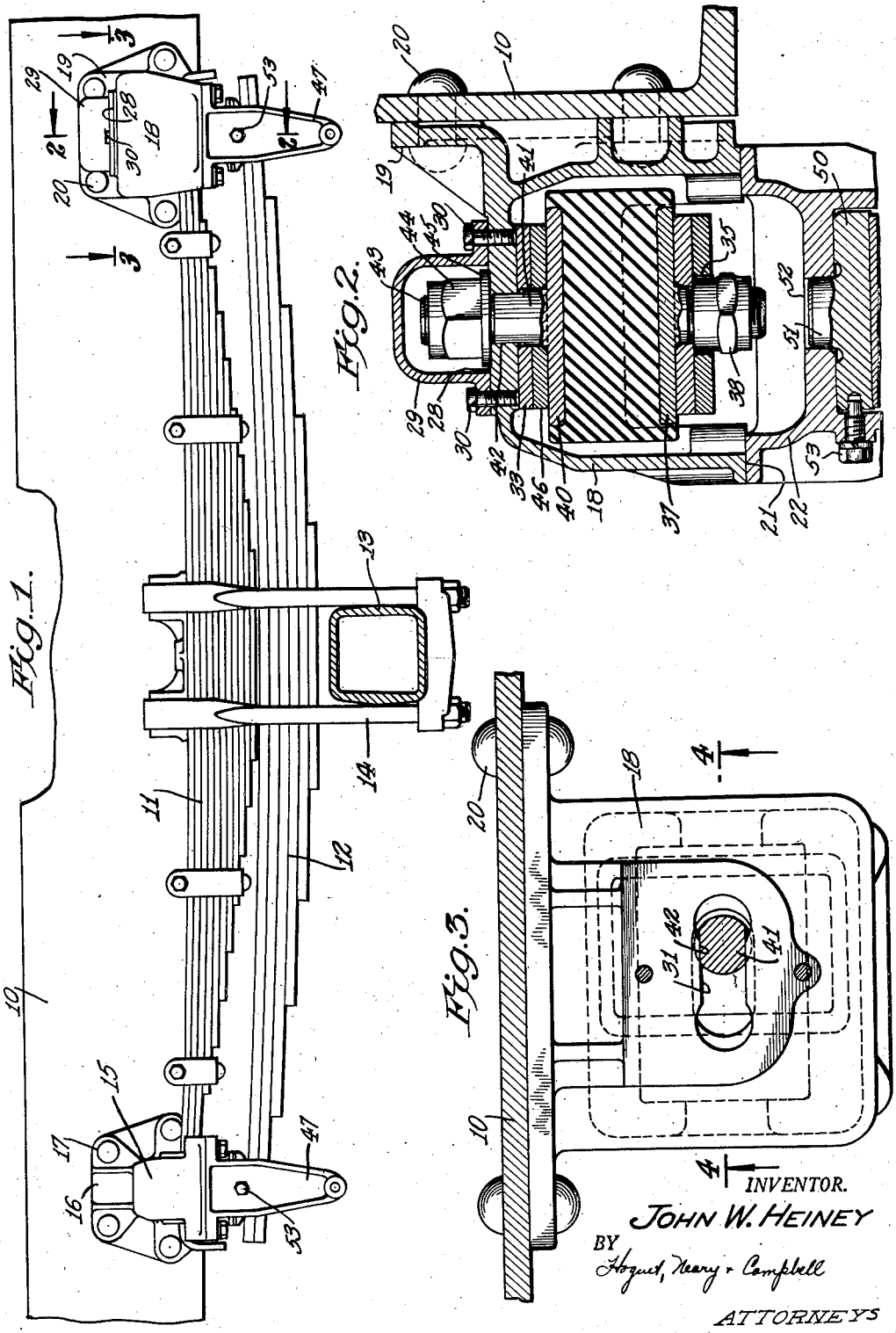
INVENTOR.
JOHN W. HEINEY
BY
ATTORNEYS

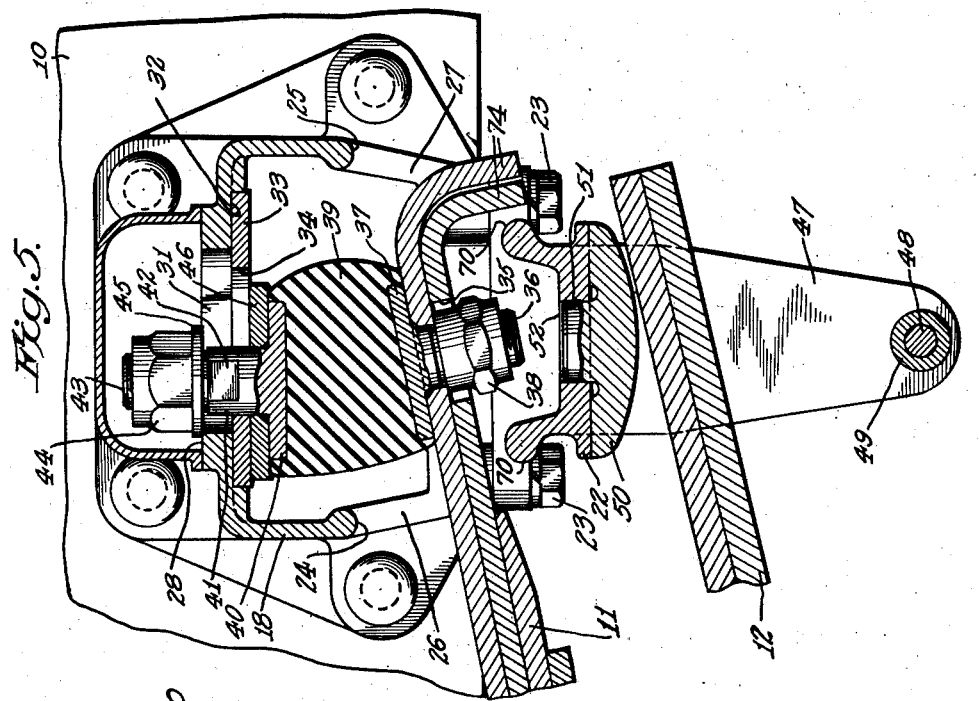
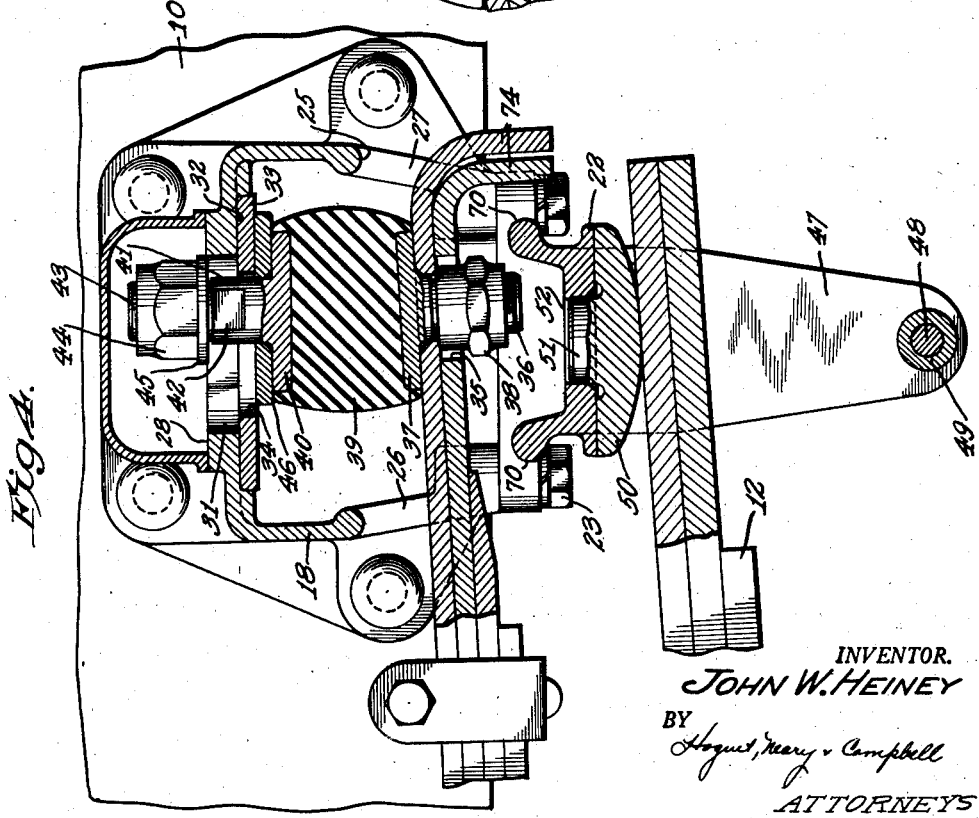

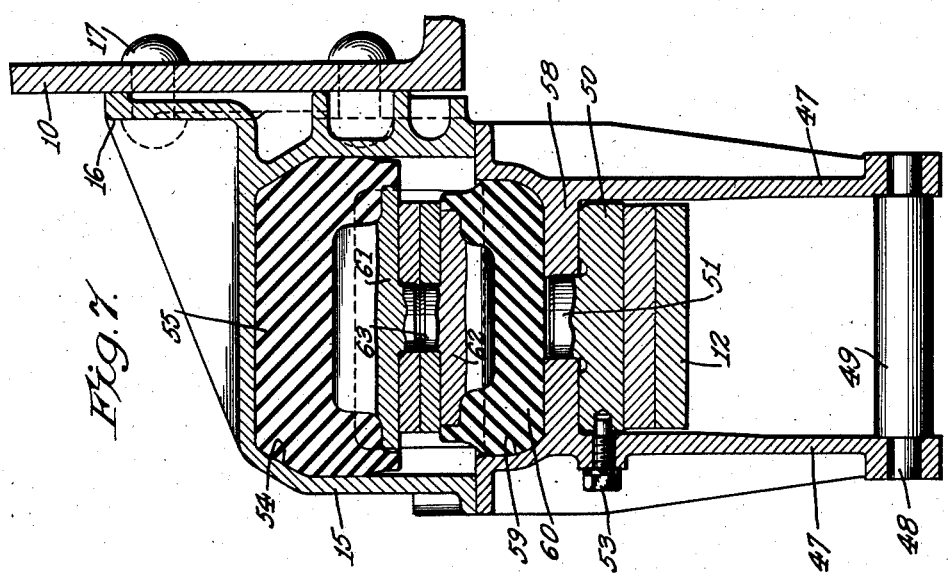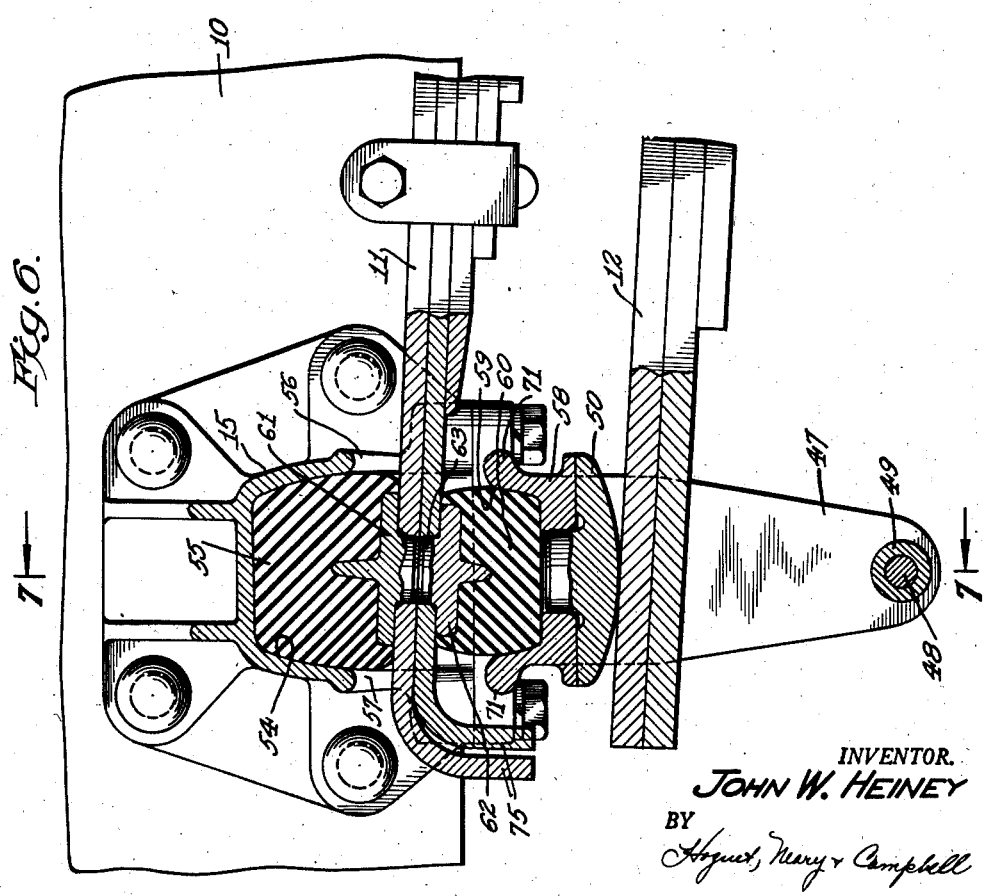

Patented Sept. 10, 1946

2,407,236

UNITED STATES PATENT OFFICE 2,407,236

RUBBER SPRING MOUNTING

John W. Heiney, Allentown, Pa., assignor to Mack Manufacturing Corporation, New York, N. Y., a corporation of Delaware Application March 16, 1944, Serial No. 526,666

10 Claims. (Cl. 267—56)

The present invention relates to a spring suspension for motor vehicles and embodies, more specifically, an improved connection between the frame and spring of a vehicle, in which connection yielding non-metallic material is provided to cushion the action of the spring with respect to the frame.

More particularly, the invention relates to a spring suspension of the above character, wherein the spring is formed of two sections, a main and a helper spring, and wherein means are provided for cushioning the main spring, at the same time providing an effective anchor connection for the main spring, additional means being provided for accommodating suitable action of the helper spring.

A further object of the invention is to provide an improved cushion connection between the frame and spring of the motor vehicle, wherein elongation of the spring may be accommodated without setting up objectionable shear or other stresses in the block of yielding non-metallic material provided in the connection.

Other objects of the invention will be apparent as it is described in greater detail in connection with the accompanying drawings, wherein Figure 1 is a view in side elevation showing a spring and spring mounting construction in accordance with the present invention;

Figure 2 is a view in transverse vertical section taken on the plane 2—2 and looking in the direction of the arrows;

Figure 3 is a view in horizontal section, taken on the line 3—3 of Figure 1 and looking in the direction of the arrows;

Figure 4 is a view in vertical section taken on the line 4—4 of Figure 3 and looking in the direction of the arrows;

Figure 5 is a view similar to Figure 4 showing the position of the parts when there is no load on the spring permitting longitudinal movement of the spring end without setting up objectionable stresses in the yielding material;

Figure 6 is a view similar to Figure 4 showing the connection at the other end of the spring; and Figure 7 is a view in transverse vertical section taken on the line 7—7 of Figure 6 and looking in the direction of the arrows.

With reference to the above drawings, the frame of a motor vehicle is indicated at 10 and is provided with a spring structure comprising a main spring 11 and a helper spring 12. These springs are secured to an axle 13 by means of a suitable clamp mechanism 14, all in accordance with standard practice.

As viewed in Figure 1, the left-hand end of the spring assembly is adapted to be mounted upon the frame 10 by means of a housing 15 formed with a mounting flange 16 and secured to the frame 10 by means of rivets 17. In a similar fashion the right-hand end of the spring is received within a housing 18 formed with a flange 19, which is secured to the frame 10 by means of rivets 20.

Referring specifically to Figures 2, 3, 4, and 5, the structure of the housing 18 will be described more specifically. From these views, it will be seen that the housing is formed with a lower mounting face 21 which is open downwardly and adapted to be closed by a cover 22 secured thereto by means of bolts 23. Cutaway portions 24 and 25 provide, respectively, apertures 26 and 27 upon opposite sides of the housing.

The top of the housing is formed with a flat mounting surface 28 upon which a second cover 29 is secured by means of bolts 30. The top of the housing 28 is also formed with a slot 31, the under-surface of the top portion 28 being recessed at 32 to receive a wear plate 33. Wear plate 33 is also formed with a slot 34 which registers with the slot 31.

The adjacent end of the main spring 11 is adapted to be received within the housing 18 through the apertures 26 and 27, as illustrated clearly in Figures 4 and 5. The end of the spring 11 is formed with apertures indicated at 35, which receive a bolt 36 formed upon a mounting plate 37. A nut 38 thus secures the bolt and mounting plate to the spring end. A block of yielding non-metallic material 39, such as rubber, is secured by vulcanization to the plate 37 and is also similarly secured to a similar plate 40 formed with a pin 41 having a squared shank 42 and a threaded extremity 43. A nut 44 is received on the threaded extremity 43 and, through a washer 45, moves back and forth on the surface 28. The pin 41 is received within the slot 34, while the shank 42 slides back and forth within the slot 31. A removable wear plate 46 is provided on the pin 41, and this slides back and forth upon the lower surface of the plate 33. The material of the plates 33 and 46 may be formed of such character as to withstand this rubbing action without the necessity of lubricant, if the material of the block 39 would be adversely effected by lubricant.

From the foregoing structure, it will be seen that elongation of the spring 11 may be accomplished without subjecting the block 39 to shearing stresses, inasmuch as the wear plate 46 will slide along the plate 33, as illustrated in Figures 4 and 5.

In order to provide a suitable connection for the helper spring, the cover 22 is formed with downwardly depending arms 47 connected by a rod 48 having a sleeve 49 rotatably mounted thereon. The end of the helper spring 12 is received between the arms 47 and is adapted to engage a removable wear plate 50 which is formed with a stud 51, which is adapted to be received within an aperture 52 formed in the transverse horizontal wall of the cover 22. A set screw 53 is provided to secure the wear plate 50 in the position shown. It will be seen that the lower surface of the wear plate is curved, thus permitting the effective length of the helper spring 12 to be shortened as it is subjected to added stress.

The left-hand end of the springs 11 and 12, as viewed in Figure 1, is mounted in such fashion as to resist effectively relative longitudinal movement of the spring with respect to the frame. To this end, the housing 15 is formed with a recess 54, Figures 6 and 7, which forms a seat for a block 55 of yielding non-metallic material, such as rubber. The housing 15 is formed with spaced apertures 56 and 57 through which the adjacent end of the spring 11 is adapted to extend, the housing 15 being formed with a cover 58 which is similar generally to the cover 22, except that it is formed with a recess 59 forming a seat for a block of yielding non-metallic material 60. The block 55 is formed with a mounting plate 61, while the block 60 is formed with a mounting plate 62, each plate being formed with a stud 63 that is received within an aperture formed in the spring end 11. In this fashion, the spring 11 is secured effectively to the housing 15, the oppositely disposed blocks 55 and 60 serving to anchor the spring end in position against all substantial movement, except pivotal movement about the mounting.

The adjacent end of the helper spring 12 is mounted similarly to the mounting described in connection with the right-hand end, including the arms 47 and wear plate 50, the structure of which is identical with the corresponding structure at the other end of the spring.

The openings 26 and 27 and 56 and 57 in the housings 15 and 18 are of sufficient vertical dimensions so as to not interfere with the free pivotal movement of the ends of the spring 12 within the housing as permitted by the yielding blocks 39, 55 and 60.

As disclosed in Figures 4, 5 and 6, the covers 22 and 58 are reversible and are provided with side flanges 70 and 71 constituting the bottom sides of the openings 26 and 27 and 56 and 57 respectively and are reinforced or beaded at their upper edges to cooperate with the downturned ends 74 and 75 of the spring 12 to prevent withdrawal of the spring from the housings.

From the foregoing, it will be seen that an effective mounting has been provided for a main and helper spring structure by means of which the main spring is mounted effectively in position so that one end thereof is anchored to the frame, whereas the other end is yieldably mounted with provision for elongation of the spring without subjecting the yieldable mounting to deleterious stresses. The mounted structure is such that the main and helper spring are effectively mounted on a common mounting means and in such fashion as to facilitate assembly and maintenance of the structure.

While the invention has been described with reference to the specific structure disclosed in the accompanying drawings, it is not to be limited save as defined in the appended claims.

I claim:

1. A yielding non-metallic connection between a spring and vehicle frame comprising a housing mounted on the frame, a spring adapted to be connected to the frame, a recess in the housing forming a seat, openings in the housing on opposite sides of the recess, a cover adapted to be secured over the recess and providing sides for said openings, an end portion of said spring extending through said openings, a block of yielding non-metallic material in the seat, means to secure the block to the spring end portion and a lug on the free end of said end portion of said spring overlapping the adjacent outer face of said cover in spaced relation thereto and constituting limiting means for limiting the retraction of said end portion from said housing.

2. A yielding non-metallic connection between a spring and vehicle frame comprising a housing mounted on the frame, a spring adapted to be connected to the frame, a recess in the housing forming a seat, openings in the housing on opposite sides of the recess, a cover adapted to be secured over the recess and providing sides for said openings, an end portion of said spring extending through said openings, a recess in the cover forming a second seat, blocks of yielding non-metallic material in the seats, means to secure the blocks to the spring end portion and a lug on the free end of said end portion of said spring overlapping the adjacent outer face of said cover in spaced relation thereto and constituting limiting means for limiting the retraction of said end portion from said housing.

3. A yielding non-metallic connection between a spring and vehicle frame comprising a housing mounted on the frame, a spring adapted to be connected to the frame, a recess in the housing forming a seat, openings in the housing on opposite sides of the recess, a cover adapted to be secured over the recess and providing sides for said openings, an end of said spring extending through said openings, a recess in the cover forming a second seat, blocks of yielding non-metallic material in the seats, means to secure the blocks to the spring end, a curved wear plate on the cover on the side opposite from the second seat and a helper spring having an end positioned for engagement with said curved wear plate.

4. A yielding non-metallic connection between a spring and vehicle frame comprising a housing mounted on the frame, a spring adapted to be connected to the frame, a recess in the housing forming a seat, openings in the housing on opposite sides of the recess, a cover adapted to be secured over the recess and providing sides for said openings, an end of said spring extending through said openings, a recess in the cover forming a second seat, blocks of yielding non-metallic material in the seats, means to secure the blocks to the spring end, a curved replaceable wear plate on the cover on the side opposite from the second seat, means to secure the wear plate in position and a helper spring having an end positioned for engagement with said curved wear plate.

5. A connection between a spring and a vehicle frame comprising a housing mounted on the frame, a main and a helper spring adapted to be connected to the frame, a cover for the housing, said housing being formed with openings in the opposite sides thereof to receive an end of the main spring, at least one seat in the housing, a block of yielding non-metallic material in the seat, means to secure the block to the said end of the main spring, a wear plate on the cover against which the helper spring is adapted to engage, and means on the cover to limit motion of the helper spring away from the wear plate.

6. A connection between a spring and a vehicle frame comprising a housing mounted on the frame, a main and a helper spring adapted to be connected to the frame, a cover for the housing, said housing being formed with openings in the opposite sides thereof to receive an end of the main spring, at least one seat in the housing, a block of yielding non-metallic material in the seat, means to secure the block to the said end of the main spring, a wear plate on the cover against which the helper spring is adapted to engage, spaced arms on the cover extending below the wear plate, and a shaft between the arms at the lower extension thereof to limit the movement of the helper spring away from the wear plate.

7. A connection between a spring and a vehicle frame comprising a housing mounted on the frame, a spring adapted to be connected to the frame, a cover for the housing, said housing being formed with openings in the opposite sides thereof to receive an end of the spring, a block of yielding non-metallic material in the housing, a seat secured to the block, means to mount the seat for movement in the direction of the length of said spring in the housing, and means to secure the block to the end of the spring.

8. A connection between a spring and a vehicle frame comprising a housing mounted on the frame, a spring adapted to be connected to the frame, a cover for the housing, said housing being formed with openings in the opposite sides thereof to receive an end of the spring, a stationary wear surface in the housing, a block of yielding non-metallic material secured to one end of the spring, a wear plate secured to the block, and means to secure said wear plate to the housing with provision for sliding with respect to the stationary wear surface.

9. A main and helper spring mounting comprising spaced housings, openings in opposite sides of the housings to receive the ends of the main spring, covers on the housings formed with spaced arms with connecting shafts to receive and limit the motion of the ends of a helper spring, curved wear plates on the covers to be engaged by the ends of the helper spring, spaced blocks of yielding non-metallic material in one of the housings, means to secure one end of the main spring therebetween, a block of yielding non-metallic material in the other housing, means to secure the last named block to the other end of the main spring, and means to secure the last named block slidably with the said other housing.

10. The combination of a yielding non-metallic connection between a spring and vehicle frame, comprising a housing mounted on the frame, a leaf spring adapted to be connected to the frame, a recess in the housing forming a seat, openings in the housing on opposite sides of the recess, a cover adapted to be secured over the recess and provided with flanges constituting bottom sides for said openings, an end of said spring projecting through said openings and provided with an angularly directed portion extending toward said cover and beyond the edge of the adjacent flange of said cover, yielding means in said seat, and means to secure said spring end to said yielding means, said openings being of sufficient dimension in the transverse vertical direction of said spring to provide for free pivotal movement of said spring end within said housing.

JOHN W. HEINEY.